UNITED STATES PATENT OFFICE 2,125,772

SEXUAL HORMONE COMPOSITIONS AND PROCESS OF PRODUCING SAME

Wilhelm Dirscherl, Heidelberg, Germany, assignor to Rare Chemicals, Inc., Nepera Park, N. Y., a corporation of New York No Drawing. Application November 5, 1935, Serial No. 48,391. In Switzerland November 7, 1934

25 Claims. (Cl. 260—26)

This invention relates to sexual hormone compositions and more especially to products of male hormonal action.

It is an object of the invention to provide such hormones or hormone compositions from substances which can be gained from vegetable materials, such as barks of trees.

It has been found, that from unsaturated alcohols of sterol or sterol-like type which are contained in the barks of certain trees and are to be gained from them, compounds may be produced which show the action of a male sexual hormone, especially in the capon comb test.

Such unsaturated alcohols are for example cinchol, cupreol, quebrachol, rhamnol. The formula for cinchol is:

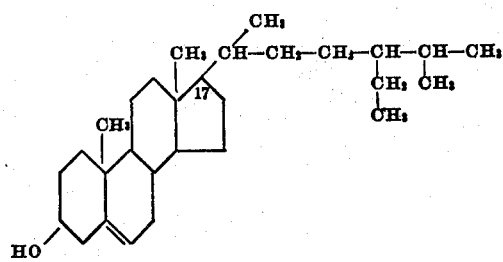

These sterol type alcohols have a side chain on C atom #17, which side chain consists of at least 8 carbon atoms. If these sterol type alcohols are first hydrogenated and then oxydized or first oxydized and then hydrogenated, products are obtained with a marked action on the growth of the comb of a castrated cock.

As raw materials I can use the alcohols precipitable with digitonine, but I may also take the stereomers not precipitable with digitonine, the pure alcohols or the esterified alcohols.

The hydrogenation as well as the oxydation may be performed in the usual way, the hydrogenation for example with catalysts of the platin-group, such as platin-oxide, but also with ignoble catalysts like nickel or nickel oxides or by common chemical methods without catalysts, the oxydation for example with chromic acid.

A transformation (epimerization) of the substances precipitable with digitonine into substances not precipitable with digitonine may be performed by the methods known for such transformations, for example by treating the former with alcoholates say with an alkyl alcoholate, such as sodium ethylate. Such treatment may take place before or after the hydrogenization of the unsaturated alcohols or also after the oxydation. Also I may first oxydize the hydroxyl group of the alcohol not precipitable with digitonine into a keto group and after this turn the ketone by hydrogenization again into the alcohol, whereupon the part not precipitable with digitonine is to be oxydized.

*Examples.*—1. 60 grams cinchol, precipitable with digitonine (Windaus & Deppe, Berichte der deutschen chemischen Gesellschaft 1933 vol. 66, page 1689) are acetylated in the usual way and dissolved in 7 liters alcohol (or in ether or in a mixture of alcohol and ether). To this solution 25 grams palladium black is added and hydrogen is passed through the mixture, under thorough shaking. After the reaction is completed, the liquid is filtered off the catalyst and strongly concentrated. From the cooled concentrate beautiful long prisms crystallize out; from the mother liquor some more may be obtained. The yield is almost quantitative. The crystals melt at 133–134° C. That there are no more double bonds present in the compound can be proven with the perbenzoic acid reaction. The compound obtained is the acetyl-dihydro-cinchol of the formula $C_{31}H_{54}O_2$. The analysis shows it to contain 81.16% C and 11.46% H while the theoretical calculation was 81.0% C and 11.8% H. The rotation power of a 1% solution in chloroform is about $+18°$.

This substance is oxydized. For this purpose 10 grams acetyl-dihydro-cinchol are dissolved in 350 ccm. glacial acetic acid and 20 grams chromic acid (in 20 ccm. water and 100 ccm. glacial acetic acid) are gradually added in the lapse of several hours at 95° C. This temperature is still kept up for a time. Upon addition of some methyl alcohol the acetic acid is evaporated in vacuum at a moderated temperature. The residue contains the active product arising from the oxydation, which possesses the characteristics of a ketone. This oxydation product is isolated in the usual way by formation of the semicarbazone and by splitting same after the oxydation product has been separated from unaltered raw material and the byproducts formed during the reaction.

The product exhibits a marked effect in the capon comb test (Fussgänger, Med. u. Chem.-Forsch. Stätten I. G. Farbenindustrie 1934 vol. 2, pages 194–204), as well as in the seminal vesicles test (Loewe und Voss, Klinische Wochenschrift vol. 9, page 481).

By recrystallization from a mixture of benzene and petrol ether, one obtains crystals of a melting point of 168–169° C. showing in about 10–20 gamma the male unit (according to Fussgänger). Through further recrystallization the melting point will be 174° C.

2. 1.25 grams acetyl-dihydro-cinchol precipitable by digitonine are dissolved in 30 ccm. absolute alcohol, in which have previously been dissolved 1 gram sodium metal. The solution is heated in a bomb tube at 215° C. for 15 hours. The tube is then cooled and the mixture washed out with alcohol and ether and acid added. The layer of ether is taken off, washed with water, dried and evaporated to dryness. The residue is dissolved in alcohol and a solution of 3.5 grams digitonine in 350 ccm. alcohol (90%) is added. After a few seconds the digitonide of the unchanged dihydro-cinchol is precipitated and filtered off. The filtrate is concentrated, the concentrate dissolved in pyridine and ether added. The precipitated digitonine is filtered off and the filtrate evaporated to dryness. The residue consists of epi-dihydro-cinchol which after recrystallization from absolute alcohol melts at 200° C. This substance is acetylated in the usual way with acetic anhydride and the acetate is oxydized as described in Example 1. The action of the oxydation product in the capon test is at least 10 times stronger than that of the epimere precipitable with digitonine.

3. 4 grams dihydro-cinchol, obtained by saponification of the acetylated product, are dissolved in 100 ccm. glacial acetic acid. To this solution a solution of 1.4 grams chromic acid in about 100 ccm. concentrated acetic acid are added drop by drop at 40° C. in the course of few hours. While the reaction takes place and during further five hours the mixture is agitated strongly. The precipitated product of the reaction product has after recrystallization from absolute alcohol a melting point of 158–159° C. Further quantities may be obtained by adding water to the mother liquor. The product contains in place of the hydroxyle group a ketone group, capable of being proved by means of hydroxylamine. It may be designated as dihydro-cinchone.

1 gram of the dihydro-cinchone is shaken with hydrogen, to which had previously been added 200 ccm. alcohol absolute, 2 ccm. concentrated hydrochloric acid and 500 mg. platin-oxide. When the hydrogenation has come to an end the solution is filtered off and neutralized. The precipitate of sodium chloride is filtered off and the filtrate evaporated to dryness. The residue is treated with benzene and the solution evaporated to dryness again. Another way is after the hydrogenation to extract the filtered solution with benzene and the benzene solution to shake repeatedly with water, whereupon the solution is dried and evaporated to dryness.

The product so obtained is dissolved in 100 ccm. alcohol (96%) and any dihydro-cinchol which may have formed is precipitated by adding an alcoholic solution of digitonine. After some time it is filtered off and the filtrate containing the epimere is evaporated to dryness. The residue is dissolved in pyridine, and ether added. If a precipitate consisting of digitonine, should be present this is filtered off and the fluid evaporated. The epi-dihydro-cinchol produced in this manner has after recrystallization from ethyl-alcohol a melting point of 200° C. The oxydation takes place in the manner described in Example 1.

Various changes may be made in the details disclosed in the foregoing specification without departing from the invention or sacrificing the advantages thereof.

In the claims affixed to this specification no selection of any particular modification of the invention is intended to the exclusion of other modifications thereof and the right to subsequently make claims to any modification not covered by these claims is expressly reserved.

I claim:

1. The method of preparing products acting as hormones comprising subjecting cinchol to a hydrogenation and an oxydation in any sequence.

2. In the process of claim 1 the epimerization of the alcohol in a desired stage of the reaction leading from the raw material to the ready hormone.

3. In the process of claim 1 the epimerization of the alcohol from the group of cinchol, cupreol, quebrachol, rhamnol in a desired stage of the reaction leading from the raw material to the ready hormone.

4. The method of preparing products acting as hormones comprising subjecting acetylated cinchol to a hydrogenation and an oxydation in any sequence.

5. In the process of claim 4 the epimerization of the alcohol in a desired stage of the reaction leading from the raw material to the ready hormone.

6. In the process of claim 4 the epimerization of the alcohol from the group of cinchol, cupreol, quebrachol, rhamnol in a desired stage of the reaction leading from the raw material to the ready hormone.

7. The method of preparing products acting as hormones comprising subjecting cinchol to hydrogenation and oxydation.

8. The method of preparing products acting as hormones comprising subjecting acetylated cinchol to a hydrogenation and oxydation.

9. The method of preparing products acting as hormones comprising subjecting cinchol, precipitable by digitonine, to a treatment with sodium alcoholate while heating, separating from cinchol precipitable by digitonine and from digitonine, and subjecting the cinchol, not precipitable by digitonine to a hydrogenation and oxydation.

10. The method of preparing products acting as hormones comprising subjecting cinchol, precipitable by digitonine, to acetylation and hydrogenization, treating the acetyl-dihydro-cinchol to an epimerization by an alcoholate, and hydrogenating and oxydizing the epimere.

11. Acetyl-dihydro-cinchol of the formula $C_{31}H_{54}O_2$ melting at about 133–134° C. and possessing a rotation power of $+18°$ as solution of 1% in chloroform.

12. The process of preparing products acting as hormones comprising subjecting raw materials from barks of trees containing unsaturated alcohols of sterol type, from the group of cinchol, cupreol, quebrachol, rhamnol to a hydrogenation and an oxidation in any sequence.

13. In the process of claim 12, the epimerization of the alcohol from the group of cinchol, cupreol, quebrachol, rhamnol in a desired stage of the reaction leading from the raw material to the ready hormone.

14. The process of preparing products acting as hormones comprising subjecting unsaturated alcohols of sterol type from barks of trees, from the group of cinchol, cupreol, quebrachol, rhamnol to a hydrogenation and an oxidation in any sequence.

15. In the process of claim 14 the epimerization of the alcohol from the group of cinchol, cupreol, quebrachol, rhamnol in a desired stage of the reaction leading from the raw material to the ready hormone.

16. The process of preparing products acting as hormones comprising subjecting acylated unsaturated alcohols of sterol type from barks of trees, from the group of cinchol, cupreol, quebrachol, rhamnol to a hydrogenation and an oxidation in any sequence.

17. In the process of claim 16 the epimerization of the alcohol from the group of cinchol, cupreol, quebrachol, rhamnol in a desired stage of the reaction leading from the raw material to the ready hormone.

18. The method of preparing products acting as hormones comprising subjecting unsaturated alcohols of sterol type, from the group of cinchol, cupreol, quebrachol, rhamnol, not precipitable by digitonine to a hydrogenation and an oxidation in any sequence.

19. The method of preparing products acting as hormones comprising subjecting acylated unsaturated alcohols of sterol type, from the group of cinchol, cupreol, quebrachol, rhamnol, not precipitable by digitonine to a hydrogenation and an oxidation in any sequence.

20. The method of preparing products acting as hormones comprising subjecting unsaturated alcohols of sterol type from barks of trees from the group of cinchol, cupreol, quebrachol, rhamnol to a hydrogenation and an oxidation, isolating the oxidation product as the semicarbazone and splitting same.

21. The method of preparing products acting as hormones comprising subjecting cinchol to a hydrogenation and an oxidation, isolating the oxidation product as the semicarbazone and splitting same.

22. The method of preparing products acting as hormones comprising subjecting acetylated cinchol to a hydrogenation and an oxidation, isolating the oxidation product as the semicarbazone and splitting same.

23. The method of preparing products acting as hormones comprising subjecting epimerized cinchol, not precipitable by digitonine, to a hydrogenation and an oxidation, isolating the oxidation product as the semicarbazone and splitting same.

24. The method of preparing products acting as hormones comprising subjecting epimerized, acetylated cinchol, not precipitable by digitonine, to a hydrogenation and an oxidation, isolating the oxidation product as the semicarbazone and splitting same.

25. A crystalline hormone preparation, melting at 174° C., containing a keton group, soluble in a mixture of benzene and ligroine and possessing a capon unit in about 10–20 gamma, obtained from acetyldihydrocinchol through oxidation, forming the semicarbazone and splitting the isolated semicarbazone.

WILHELM DIRSCHERL.